Nov. 18, 1924.  1,515,745
E. P. MULROONEY ET AL
LOCKING VALVE
Filed Aug. 21, 1920
Fig. 1,
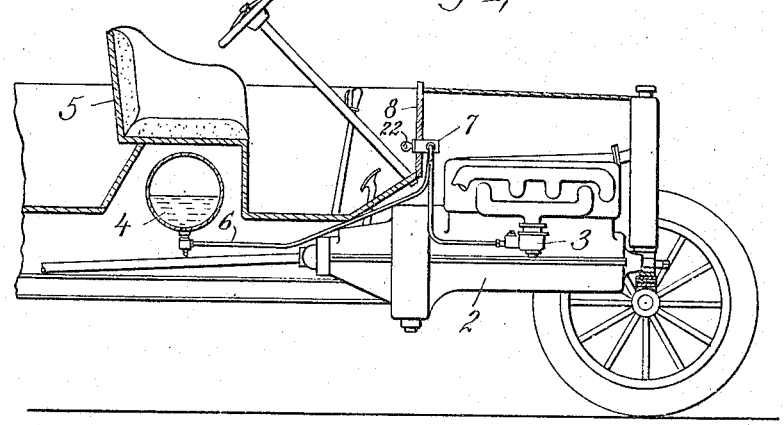
Fig. 2,
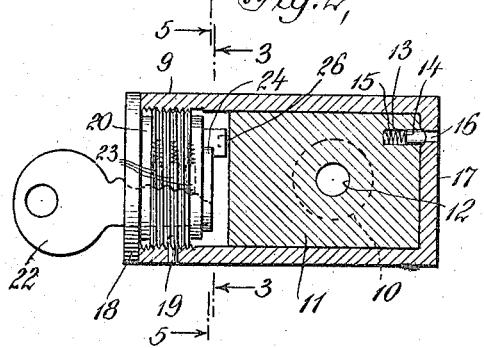
Fig. 3,
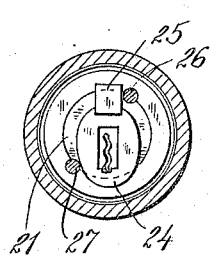
Fig. 4,
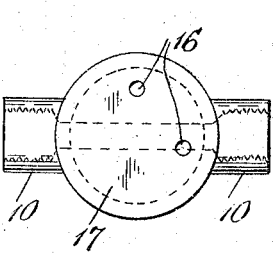
Fig. 5,
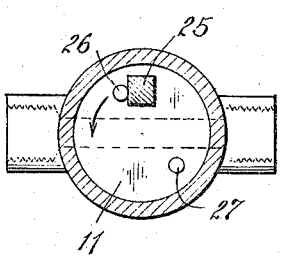
Fig. 6,
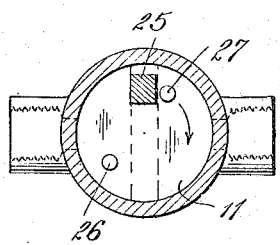
Edward P. Mulrooney Inventors.
and James O'Connell
By their Attorney
Walter J. Gill.

Patented Nov. 18, 1924.

1,515,745

UNITED STATES PATENT OFFICE.

EDWARD P. MULROONEY AND JAMES O'CONNELL, OF NEW YORK, N. Y.

LOCKING VALVE.

Application filed August 21, 1920. Serial No. 405,030.

*To all whom it may concern:*

Be it known that we, EDWARD P. MULROONEY and JAMES O'CONNELL, citizens of the United States, and residents of New York city, in the counties of Bronx and New York, respectively, and State of New York, have invented certain new and useful Improvement in Locking Valves, of which the following is a specification.

This invention relates to locking valves particularly intended for use in cases in which it is desired that the flow of gases or liquids shall be kept under the control of authorized persons.

One of the principal fields of use for valves of this kind is in connection with automobiles, thefts of which are at present increasing at an alarming rate. It has heretofore been proposed to provide locking valves for controlling the supply of fuel to the engines of motor cars, in order to prevent the vehicles from being started by unauthorized persons, and many devices have been devised for this purpose, but they are more or less complicated in structure and expensive to manufacture and in many cases fail to afford adequate protection to the vehicle.

It is an object of this invention to provide a locking valve of simple, yet rugged construction, which may be cheaply manufactured and easily assembled, and when installed can only be manipulated by a certain key. In accordance with the invention the valve consists of a casing provided with ports adapted to be connected to the pipe line which is to be controlled by the valve. Within the casing is a rotary member or plug provided with a bore adapted to be brought into registry with the ports to permit the flow of gas or liquid through the pipe line or turned from such position to cut off the flow. Suitable devices are provided for insuring that the plug shall occupy either its "on" or "off" position when it is manipulated.

For the purpose of turning the plug, the casing is provided with a cap containing a lock of the "Yale" or similar type. The inner end of the barrel of the lock and the adjacent end of the plug are provided with coacting parts which are so related that when the barrel is turned by the key, after the tumbler pins have been freed by the insertion of the key, the plug wil be turned to open or close the valve. The arrangement of the parts is such that it is necessary after inserting the key to turn the barrel through substantially 90 degrees in one direction to cause the coacting parts of the barrel and plug to rotate the plug to open the valve, after which the barrel must be turned back to its normal position to permit the key to be withdrawn. To close the valve, the key is inserted and the barrel is turned through substantially 90 degrees in the opposite direction to cause the coacting parts to rotate the plug to cut off the passage of gas or liquid therethrough. The peculiar combination of movements necessary to be imparted to the device also increases its security by preventing a rapid manipulation by one unfamiliar with its construction, even should he be able to obtain a key which would fit the lock.

The particular nature of the invention, as well as other objects and advantages thereof, will appear more clearly from a description of a preferred embodiment as shown in the accompanying drawing, in which—

Fig. 1 shows the valve applied to an automobile;

Fig. 2 is a longitudinal sectional view of the valve;

Fig. 3 is a sectional view along the line 3—3 of Fig. 2;

Fig. 4 is a view of one end of the valve;

Fig. 5 is a sectional view along the line 5—5 of Fig. 2, when the valve is in open position, and Fig. 6 is a similar view when the valve is in closed position.

Referring to the drawing, 1 indicates an automobile having an engine 2 which is supplied with gaseous fuel from a carburetor 3. The liquid fuel is carried in a tank 4 placed beneath the seat 5, or in any other convenient location. The tank is connected to the carburetor by a pipe line 6 which includes the valve 7 of the present invention, which is preferably mounted on the dash-board 8 in position to be conveniently reached by the driver. Fuel may be forced through the pipe line by air under pressure in the tank.

The valve comprises a cylindrical casing 9 provided with diametrically opposite nipples 10 to which the pipe line is connected. Within the casing is a cylindrical valve plug 11 provided with flat ends and a diametrical bore 12 adapted, in one position of the plug, to register with the nipples 10 and provide communication between the two sections of the pipe line. The plug fits closely within the casing so as to prevent leakage around its exterior from one nipple to the other when the plug is turned to its cut-off position with the bore 12 out of alinement with the nipples.

For the purpose of holding the plug in either of its open or shut positions, its inner end is provided with a socket 13 containing a plunger 14 which is pressed outwardly by a spring 15 into either one of the two recesses 16 in the closed end 17 of the casing 9; the recesses being arranged as shown in Fig. 4 so that the plunger fits into one of them when the bore 12 is in alinement with the nipples 10 and into the other one when it is at substantially right angles to its former position.

The opposite end of the casing 9 is closed by a cap 18 which is threaded into the casing. A pin 19 may be used to prevent the cap from being unscrewed, this pin being concealed within the dash-board when the valve is in place. Mounted within the cap is a lock 20 of the "Yale" type, the barrel 21 of which may be turned by a key 22 when the tumbler-pins 23 have been moved by the key to free the barrel in a well known manner. Attached to the inner end of the barrel 21 is a flat member 24 provided with an extension or part 25 terminating closely adjacent to the end of the plug 11 and adapted to engage either one of two pins or projections 26 and 27 extending from the end of the plug, as shown most clearly in Figs. 5 and 6.

The arrangement of the parts is such that when the valve is in closed position as shown in Fig. 6, the plunger 14 enters one of the recesses 16 and the pin 27 lies at one side of the extension 25 as shown in this figure; the other pin 26 occupying the position shown. If now the key be inserted and the barrel be turned in a clockwise direction as shown in Figure 6, the plug will be rotated by the engagement of the extension 25 with pin 27 until the plunger 14 enters the other recess 16, at which time the bore 12 will be brought into alinement with the nipples 10 (see Fig. 5), thus allowing fuel to flow from the tank 4 to the carburetor 3 through the pipe line 6. In order to remove the key it is necessary to rotate the barrel of the lock back to its normal position, but the plug 11 remains in the position to which it has been turned with the pins occupying the position shown in Fig. 5. Preferably the barrel should be rotated through substantially 90 degrees to carry it from its normal position to that in which the valve is open.

In order to close the valve, the barrel is rotated in a counter clockwise direction through substantially 90 degrees from its normal position; that is, the position in which the key may be inserted or removed. This movement of the barrel will cause the extension 25 to engage the pin 26 and turn the plug 11 until the pins occupy the position shown in Fig. 6, with the other pin 27 in position to be engaged by the extension 25 when it is again desired to open the valve.

After the valve has been opened or closed, it is necessary to bring the barrel back to its normal position before the key can be withdrawn, and the peculiar combination of movements necessary to be imparted to the device to operate it properly will hinder its correct operation by one unfamiliar with it, even in case he should be able to turn the barrel. Unless, however, he obtains a proper key, he will not be able to do this, and the valve is so mounted upon the dashboard that he cannot well free it without breaking the pipes, thus preventing him from starting the engine. The device is of simple and rugged construction, well adapted to stand all ordinary usage and resist tampering. It may be cheaply manufactured and easily assembled and mounted upon the dash-board or other place where it is to be used.

While the valve has been shown as arranged to control the flow of fuel from the supply tank, it may also be used in the intake manifold for controlling the flow of gas from the carburetor to the engine. Apart from its use upon an automobile, it may be used in any piping system or apparatus in which it may be desired to place the flow of gases or liquids under the control of authorized persons. It will also be understood that various changes may be made in the structural details of the device without departing from the principle of the invention as defined in the appended claims.

We claim:—

1. A locking valve comprising a casing provided with ports, a lock mounted in one end of the casing and including a member adapted to receive a key when in normal position and to be turned in either direction therefrom by the key, a member rotatably mounted within the casing and provided with a bore adapted to be brought into registry with the ports, a pair of parts associated with one of the members and a part associated with the other member and adapted to coact with one of the parts of the pair when the member of the lock is in normal position and the bore of the rotatable member registers with the ports and to coact with the other part of the pair when the member of the lock is in normal position and the bore of the other member lies at an angle to its first named position, whereby the valve may be opened or closed by turning the member of the lock in opposite directions through substantially one quarter of a revolution from its normal position.

2. A locking valve comprising a casing provided with ports, a lock mounted in one end of the casing and including a barrel adapted to receive a key when in normal position and be turned in either direction from such position by the key, a part secured to the inner end of the barrel, a member rotatably mounted within the casing and provided with a bore adapted to be brought into registry with the ports, and a pair of pins projecting from one end of the member, one of said pins lying adjacent to the part secured to the barrel when the latter is in normal position and the bore in the cylindrical member registers with the ports in the casing, and the other of said pins lying adjacent to the part secured to the barrel when the latter is in normal position and the bore lies at right angles to its position in registry with the ports, whereby the valve may be opened or closed by turning the barrel in opposite directions through substantially one quarter of a revolution from its normal position.

3. A locking valve comprising a casing provided with ports, a lock mounted in one end of the casing and including a member adapted to receive a key when in normal position and to be turned in either direction therefrom by the key, a member rotatably mounted within the casing and provided with a bore adapted to be brought into registry with the ports, a pair of projections extending from one of the members, a part associated with the other member and adapted to lie adjacent to one of the projections when the member of the lock is in normal position and the bore of the member within the casing registers with the ports and to lie adjacent to the other projection when the member of the lock is in normal position and the bore of the other member lies at right angles to its first named position, whereby the valve may be opened or closed by turning the member of the lock in opposite directions through substantially one quarter of a revolution from its normal position.

4. A locking valve comprising a casing provided with ports, a lock mounted in one end of the casing and including a member adapted to receive a key when in normal position and to be turned in either direction therefrom by the key, a member rotatably mounted within the casing and provided with a bore adapted to be brought into registry with the ports, a part associated with the member of the lock, a pair of projections extending from the member within the casing, one of said projections lying adjacent to the part when the member of the lock is in normal position and the bore of the member within the casing registers with the ports, and the other of said projections lying adjacent to the part when the member of the lock is in normal position and the bore lies at right angles to its position in registry with the ports whereby the valve may be opened or closed by turning the member of the lock in opposite directions through substantially one quarter of a revolution from its normal position.

5. A locking valve comprising a casing provided with ports, a member rotatably mounted within the casing and provided with a bore adapted to be brought into registry with the ports and a pair of pins projecting from one end, a lock mounted at one end of the casing and provided with a barrel and a plurality of devices adapted to be manipulated by a key to free the barrel and permit it to be turned by the key, said devices preventing the withdrawal of the key when the barrel is turned, a part secured to the inner end of the barrel and provided with an extension lying between the pins and adapted to be brought into engagement selectively therewith, said pins being so arranged with relation to said part that the member may be turned to open or closed position by turning the barrel through substantially one quarter of a revolution in opposite directions while allowing the barrel to be turned back in either direction to the position in which the key may be withdrawn without movement of the member during such return movement of the barrel.

6. A locking valve comprising a cylindrical casing provided with ports, a lock mounted in one end of the casing and including a barrel adapted to receive a key when in normal position and be turned in either direction therefrom by the key, a member secured to the inner end of the barrel, a cylindrical member rotatably mounted within the casing and provided with a bore adapted to be brought into registry with the ports, and a pair of pins projecting from one end of the cylindrical member, one of said pins lying adjacent to one side of the member secured to the barrel when the latter is in normal position and the bore in the cylindrical member registers with the ports in the casing, and the other of said pins lying adjacent to the other side of the member secured to the barrel when the latter is in normal position and the bore lies at right angles to its position in registry with the ports, whereby the valve may be opened or closed by turning the barrel in opposite directions through substantially one quarter of a revolution from its normal position.

Signed at New York city, in the county of New York and State of New York, this 20th day of August, A. D. 1920.

EDWARD P. MULROONEY.
JAMES O'CONNELL.